Feb. 14, 1956 J. H. KNOWLES 2,734,634
SCUM SKIMMING DEVICES FOR LONGITUDINAL SEDIMENTATION
TANKS HAVING RECIPROCATING SEDIMENT
CONVEYING APPARATUS
Filed Jan. 25, 1954 7 Sheets-Sheet 1

FIG. 1.

INVENTOR
JOHN H. KNOWLES,
BY
William J Fox
ATTORNEY

Feb. 14, 1956     J. H. KNOWLES     2,734,634
SCUM SKIMMING DEVICES FOR LONGITUDINAL SEDIMENTATION
TANKS HAVING RECIPROCATING SEDIMENT
CONVEYING APPARATUS
Filed Jan. 25, 1954                   7 Sheets-Sheet 6

INVENTOR
JOHN H. KNOWLES,
BY William J. Fox
ATTORNEY

Feb. 14, 1956    J. H. KNOWLES    2,734,634
SCUM SKIMMING DEVICES FOR LONGITUDINAL SEDIMENTATION
TANKS HAVING RECIPROCATING SEDIMENT
CONVEYING APPARATUS
Filed Jan. 25, 1954    7 Sheets-Sheet 7

INVENTOR
JOHN H. KNOWLES,
BY William J. Fox
ATTORNEY

United States Patent Office 2,734,634
Patented Feb. 14, 1956

2,734,634

SCUM SKIMMING DEVICES FOR LONGITUDINAL SEDIMENTATION TANKS HAVING RECIPROCATING SEDIMENT CONVEYING APPARATUS

John H. Knowles, Cos Cob, Conn., assignor to Dorr-Oliver Incorporated, a corporation of Delaware Application January 25, 1954, Serial No. 405,766

4 Claims. (Cl. 210—55)

This invention relates to sedimentation tanks of the longitudinal rectangular type where feed liquid, for example, sewage, enters the tank at one end thereof, to deliver clarified liquid by overflow from the opposite end, while solids or suspended matter depositing upon the tank bottom is removed therefrom by sediment raking mechanism conveying the sediment or sludge to a point or zone of discharge.

In the longitudinal type of tank herein contemplated, the sludge conveying mechanism comprises a wheeled frame or carriage spanning the tank and usually operating upon tracks atop the longitudinal side walls of the tank, so that sediment or sludge may be conveyed to discharge incident to the back and forth movement of the carriage between the ends of the tank. According to one form, the carriage has rigid therewith a bracket structure extending downwardly into the tank, to provide a mounting for the sludge engaging or raking devices proper, such devices comprising a tiltable raking member swingable about a horizontal axis into and out of engagement with the sediment on the tank bottom. Mechanism is provided for automatically actuating the raking member in accordance with the direction of movement of the carriage so that the sediment is conveyed towards and into the zone of discharge at the bottom of the tank.

A form of such mechanism that lends itself environmentally for the embodiment of this invention comprises a rake carrying frame swingably mounted upon the lower end of the bracket structure depending from the carriage frame proper. This rake carrying frame is tiltable about a transverse horizontal axis in scale-beam fashion, each free end of the frame being provided with a set of raking blades, so that in one tilted position one set of blades will be operatively engaged upon the tank bottom whereas in the oppositely tilted position the other set of blades will be so engaged. The tilting of the rake carrying frame is effected automatically in timed relationship with the carriage movement, namely at the point of reversal of the direction of its travelling movement at each end of the tank. In this way, each such reversal will lower to operative position the then outwardly pointing end of the rake carrying frame while raising to inoperative position the inwardly pointing end of that frame, preparatory to the starting of the carriage from a respective end of the tank. A reversible rope drive mechanism may be employed for moving the carriage, as well as to effect the tilting of the rake carrying frame.

A longitudinal sedimentation tank of the type herein contemplated is sometimes preferred over the well known round type of tank equipped for central feed with peripheral overflow, and has rotary sediment raking mechanism. In some instances of plant layout, as in the case of sewage treatment plants, a longitudinal tank may be preferable because of local conditions of feed supply, or because of local space conditions, and possibly also because it may lend itself more conveniently to the requirement of a particular plant layout.

For example, whereas the round type tank usually or often is such as to require an underground conduit to supply the central bottom feed to the tank, the longitudinal type of tank feeds at one end while discharging overflow at the opposite end, with scum skimming devices mounted upon the carriage to convey the scum or floating matter in one-way fashion from the overflow end of the tank to and into a transverse scum trough provided at the influent end.

In distinction from the round tanks, the longitudinal tank provides design flexibility as to its proportion of length to width; yet an inherent limitation in such tanks is due to the fact that the effective length of the overflow or the overflow capacity has been limited by the width of the tank, if the full clear width of the tank was to be left unobstructed to allow for the unhampered operation of the scum skimming means aforementioned.

That is to say, although it has been proposed to increase the overflow capacity of such a tank by extending the overflow launder or weir partway along the sides of the tank, to form an overflow edge that is U-shaped in plan view, a shank portion of this U-shape or lateral portion of this launder will constitute an inward overhang where the top edge of the sidewall itself is encumbered by the track rails of the carriage. Such overhang presents an obstruction or restriction with respect to the operation and effectiveness of scum skimming elements or devices of the reciprocatory kind as now known.

This invention has for its object to provide improved scum skimming means travelling with the carriage, and effective to sweep the entire liquid surface irrespective of its irregular outline such as due to the proposed extensions or lateral portions of the U-shaped overflow launder. In other words, it is among the objects to provide highly effective scum skimming devices for a longitudinal tank where an irregularly shaped liquid surface is to be swept clear of scum or floating matter by means of scum skimming devices travelling with the carriage.

This object is attained by providing main skimming means with a main skimmer blade adapted to sweep a wide main swath from end to end of the tank, the width of this main swath being substantially equal to the distance between the overhanging side portions of the overflow launder, in combination with auxiliary or complementary skimming means also mounted on the carriage and cooperatively associated with the main skimming means in such a manner as to sweep a narrow complementary swath partway along the wide main swath, so that the total area of all swaths, namely the long wide swath in the middle and the shorter end and narrower swath at each side will cover substantially the total area of the irregularly shaped surface to be swept in one-way fashion by the compound effect of the main and the auxiliary skimming devices of this invention.

Features of this invention reside in the means for actuating the main and the auxiliary skimming devices so that their functions are coordinated and timed with respect to one another in that the main device should execute a full length one-way scum skimming sweep from end to end of the tank, while the auxiliary device should execute a sweep only partway along with the main device, namely along that portion of the length of the tank that is not encumbered by the over-hanging lateral portions of the overflow launder.

According to one feature, each of the skimming devices is swingably mounted upon the carriage or upon the bracket structure extending downwardly therefrom, so as to be movable about a horizontal transverse axis into and out of scum engaging positions. Control devices are provided whereby both the main and the auxiliary skimming blades are held in an inoperative raised position while the carriage travels away from the scum receiving trough, but held in scum engaging position while the carriage travels towards the scum receiving trough.

That is to say, upon reversal of the carriage movement at the feed supply and scum discharge end of the tank, the control devices hold all skimmer blades inoperative with the auxiliary skimmer blade overriding the respective lateral portions of the overflow launder until the carriage reaches the opposite or overflow end of the tank; upon arrival at the overflow discharge end only the main skimmer blade is allowed to drop to its scum engaging position, to be operative as the carriage travels back towards the feed end of the tank, while the auxiliary blade remains inoperative in overriding position above the lateral portion of the overflow launder, but joins the main skimmer blade in scum engaging position above the overflow launder to assume its skimming function along the aforementioned narrow swath partway along the wide swath pursued by the main skimmer blade.

According to one embodiment, the device for automatically controlling the operation of the skimmer blades in a desired manner concurrently and in timed relationship with the back and forth movement of the carriage, comprises a cam rail extending along each of the lateral portions of the overflow launder, which rails are for sustaining the auxiliary blades in their overriding position with respect to the associated launder sections; the skimmer actuating device further comprises one-way yieldable or linear flexible elements or motion transmitting connections between the tiltable rake carrying frame and the swingable skimmer blades, namely lengths of rope or wire whereby the tilting motion of the rake carrying frame is translatable into swinging motion of the arm structures that carry the skimmer blades. Thus controlled the skimmer blades move up or down in consonance with the tilting motion of the rake carrying frame. When the carriage travel starts from the overflow discharge end of the tank, the auxiliary blade although released by a corresponding tilting movement of the rake carrying frame is nevertheless held in overriding position upon and by the cam rail with respect to the associated lateral position of the overflow launder.

Further particularized, a known reversible rope drive mechanism has the dual function of reciprocating the carriage between the ends of the tank and of tilting the rake carrying frame in unison with the reversals in the direction of travel at each end of the tank; the tilting movement of the rake carrying frame in turn being effective through motion transmitting elements to actuate the skimmer blades in the manner desired.

In summary, this invention provides for a special combination of a main skimming device with an auxiliary skimming device, both travelling with the raking means along the length of the longitudinal settling tank. Both skimming devices are so cooperatively and kinematically associated with one another that they will cover and work upon an irregular skimming area in that tank, that skimming area here being defined by the basic rectangular tank area minus a restrictive area presented by the longitudinal lateral overhanging effluent launders of the tank. Characteristically a longitudinal auxiliary launder extends from the effluent only part way to the influent end of the tank, thus presenting the problem of providing skimming means to operate upon the irregular area above defined.

The operation of the auxiliary skimming device is here associated and timed with the operation of the main skimming device by way of being controlled from the up and down movement of the sludge raking means, this in combination with the action of the cam rail elements extending along respective auxiliary effluent launders along the sides of the tank. The coaction and timing of the respective skimming devices is obtained by way of motion transmitting means connecting the movable raking means with the respective skimming devices. That is to say, a main motion transmitting device operates to lower the main skimmer blade to its skimming position in unison with the resetting of the raking means at the time of starting from the effluent end towards the influent end of the tank, and later on operates to raise the main skimmer blade in unison with the resetting of raking means when starting from the influent end of the tank; an auxiliary motion transmitting device comprising a one-way yieldable element operates to raise the auxiliary skimmer in unison with the resetting of the raking means when starting from the influent end of the tank together with the raising of the main skimmer blade so that the skimmer blades of both skimming devices will travel in a non-skimming position towards the effluent end of the tank. Thereafter, when the direction of travel is reversed at the effluent of the tank the resetting of the raking means will return the main skimmer blade to skimming position while at the same time similarly releasing the auxiliary blade from its raised inactive position, although the auxiliary skimmer blade at that time is intercepted by the cam rail member thus slackening the one-way yieldable auxiliary motion transmitting means until the auxiliary blade will drop into active skimming position when riding off the inner free end of the cam rail element, then taking up the slack of the yieldable transmitting element to continue active along with the then active main skimmer blade towards the scum receiving launder at the influent end of the tank. In this way, the main skimming device covers a wide swath skimming one-way fashion from the effluent end to the influent end of the tank, whereas the auxiliary skimming device concurrently covers a narrow swath extending only part way along the tank towards the influent end thereof. Hence, the irregular total skimming area served by this combination of skimming devices comprises a wide rectangular portion adjacent to the influent end, and a narrow rectangular portion adjacent to the effluent end of the tank.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

In the drawings:

Figure 1ᵃ is a diagrammatic view showing in plan view the irregular surface area to be covered by the compound effect of the main and the auxiliary skimming devices of this invention, where the overflow discharge trough is U-shaped in cross-section.

Figure 1ᵇ is a similar diagrammatic view, with the addition of intermediate longitudinal overflow launders.

Figures 11 and 12 are diagrammatic operational views illustrating sequential phases of the operating cycle of the sludge raking and scum skimming mechanisms incident to the reciprocation of the carriage upon the tank; Figure 12 showing the carriage travelling from the discharge end to the feed end of the tank with the scum skimming means operatively engaged.

Referring to Figures 1 to 9, the settling tank being of the longitudinal rectangular type comprises a flat bottom 10 having a discharge zone or outlet 11 disposed intermediate its ends, side walls 12 and 13, and end walls 14 and 15. End wall 14 is provided with a transverse feed supply channel 16 having feed supply openings 17 leading from the channel into the tank proper, and also having a feed supply conduit indicated at 18. Across the feed inlet end of the tank extends a scum receiving channel or trough T having a receiving ramp 19 up which scum is pushed into the trough by the scum skimming devices to be described below. A scum discharge pipe 20 is shown to lead from one end of trough T into a sump $20^a$. The opposite end wall 15 is provided with a discharge trough or conduit 21 for the overflowing liquid, which discharge conduit in turn is supplied from an overflow receiving discharge launder L proper. The discharge launder L comprises an intermediate section 22 extending transversely along the end wall, and lateral sections 23 and 24 extending at right angles from each end of the intermediate section and longitudinally partway along each side wall of the tank, the lateral longitudinal launder sections representing an inward overhang with respect to the lateral walls of the tank. That is to say, the overflow discharge launder proper in plan view is of U-shaped appearance (see also Figure $1^a$), the intermediate transverse section 22 having an effective overflow length $a$, the lateral longitudinal sections 23 and 24 having an effective length $b$ and having an overhang the extent of which is designated as $d$ (see Figure 8).

Figure 1:
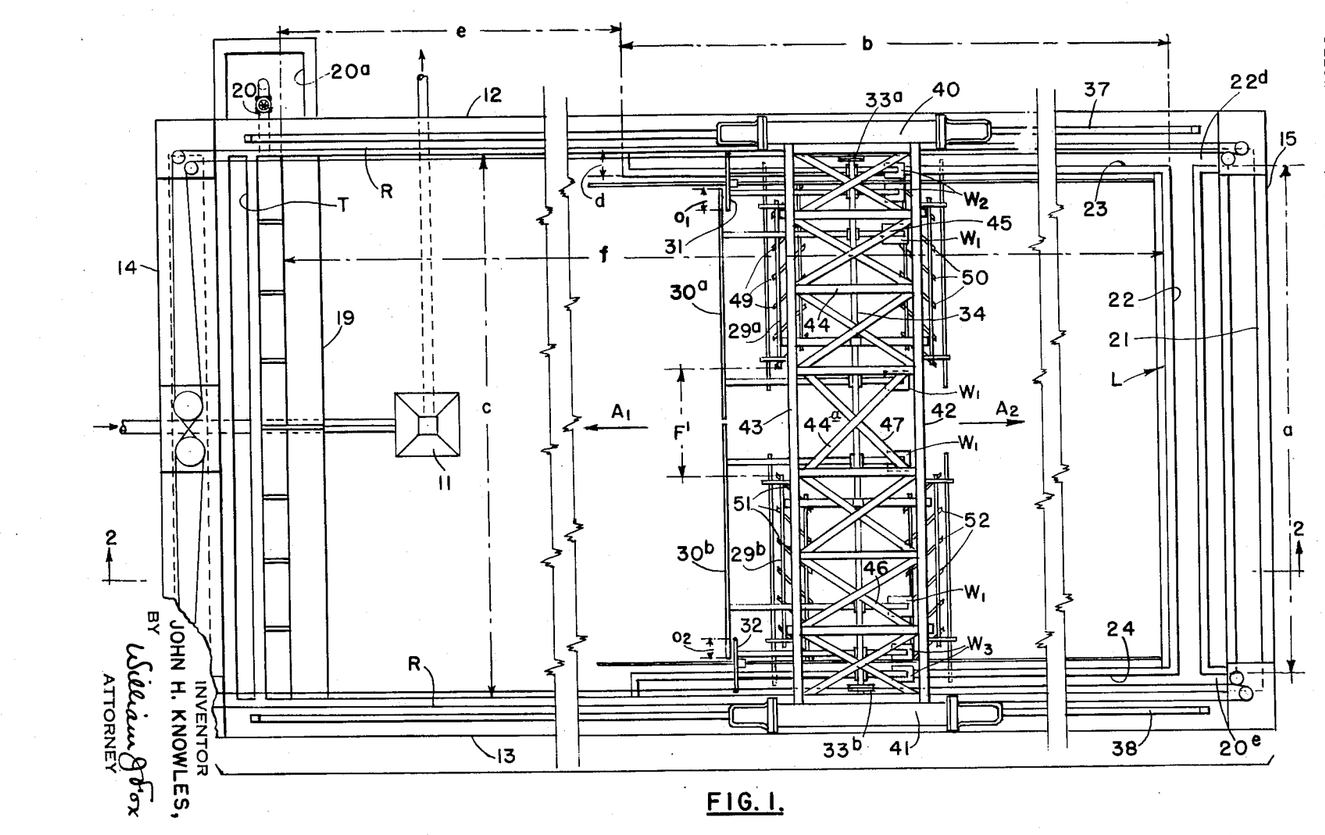
Figure 1 is a semi-diagrammatic plan view of a longitudinal sedimentation tank showing the overhanging lateral portions or extensions of the overflow launder, and also showing the carriage operating atop the sidewalls of the tank, with the sludge raking means as well as scum skimming means operatively interconnected.
Figure 1A:
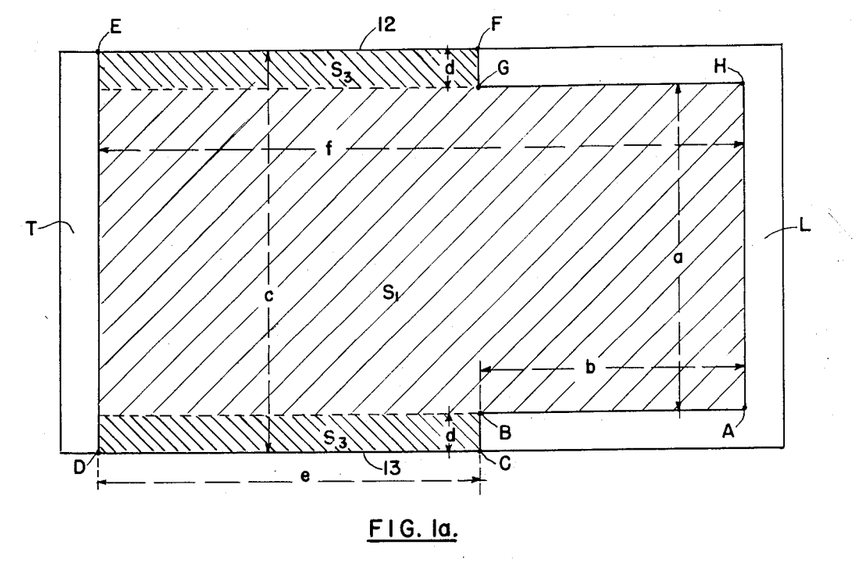

Accordingly, the liquid surface (see Figure $1^a$) to be skimmed by the scum skimming devices of this invention has an irregular outline comprising a narrower portion at one end of the tank and defined by the width $a$ and the length $b$, and a wider portion at the other end of the tank and defined by the width $c$ (or $a+2d$) and the length $e$. This irregular surface to be skimmed is therefore also definable by its eight corner points A, B, C, D, E, F, G, H.

Otherwise defined for the purpose of this invention, this irregular surface comprises a longitudinal wide portion or wider area strip of the width $a$ and the length $f$, and a pair of narrower and shorter portions or narrow area strips extending partway along the side walls of the tank at each side of the wide area strip, each of the narrow area strips having the width $d$ and the length $e$.

According to the invention, the scum skimming devices to operate upon this irregularly shaped surface (A, B, C, D, E, F, G, H) comprise a main skimming device to cover a wide swath $S_1$ (indicated by diagonal widely spaced shade lines) corresponding to the above defined wide centrally extending area strip of the width $a$, and a pair of auxiliary skimming devices to cover a narrow swath $S_2$ (indicated by diagonal narrowly spaced shade lines) at each side of the wide swath $S_1$ and corresponding to the above defined narrow area strips of the width $d$.

The transverse launder portion 22 (see Figures 1 and 2) is shown to have a bottom $22^a$ and a pair of side walls $22^b$ and $22^c$, and also to have at each end thereof conduit connections $22^d$ and $22^e$ (see Figure 1) leading into the discharge conduit 21. The lateral longitudinal launder portions 23 and 24 constitute overhangs $d$ extending from the side walls of the tank, the launder portion 23 having a bottom $23^a$ and a sidewall $23^b$, the launder portion 24 having a bottom $24^a$ and a sidewall $24^b$, the sidewalls $23^b$ and $24^b$ defining between them the distance $a$ above defined in Figure $1^a$.

An overflow weir W extends along the U-shaped length of the overflow launder L, that is along the launder walls $22^b$, $23^b$, $24^b$, the weir W here being indicated to have notches or a saw-toothed overflow edge E'.

Each of the longitudinal launder sections 23 and 24 has coextensive therewith a cam rail structure 25 and 26 respectively (see also detail Figures 2, 3, 4, 5, 6). The cam rail structure 25 is mounted upon the wall $23^b$ of launder 23, to be spaced from that wall and from the weir W a distance $h$ inwardly with respect to the tank, and thus mounted as by means of brackets 27 fixed upon wall $23^b$. The cam rail structure 26 is similarly mounted upon the wall $24^b$ of the opposite launder section 24. The cam rails 25 and 26 are to serve as motion guiding elements or tracks for the auxiliary skimming devices to be described in detail further below.

There will now be described the reciprocatable carriage structure U and its appurtenances including a downwardly extending bracket structure 28 for mounting thereon a pair of tiltable sediment engaging rake carrying frames $29^a$ and $29^b$ as well as a combination of scum skimming devices as represented by a pair of swingable main skimmer blade elements $30^a$ and $30^b$ and a pair of tiltable auxiliary skimmer blade elements 31 and 32 disposed at respective sides of the main skimmer elements and coactive therewith to operate upon the irregularly shaped surface A, B, C, D, E, F, G, H as above defined.

There will then also be described the rope drive means for the carriage, which are known per se, but which in addition to their known dual function of reciprocating the carriage and tiltingly actuating the rake carrying member, are here employed to assume a third function, namely that of actuating the skimmer devices or skimmer blades in coaction with the cam rail structures above already described. This is here accomplished by operatively coupling the tiltable rake carrying frames $30^a$ and $30^b$ with the skimmer blade elements 31 and 32.

There is nothing new in the reciprocatable carriage structure itself or in the manner in which it supports and operates the sediment engaging raking means, nor is there any novelty in the manner or means whereby the carriage is moved reciprocatingly between the ends of the tank and in the manner in which the rake carrying frame is tilted in unison with the reversals of the direction of travel of the carriage at the ends of the tank. That is to say, it is not new (as shown in the copending patent application of Charles H. Scott, Serial No. 264,025, filed December 29, 1951, now Patent No. 2,670,080) to employ a drive rope arrangement whereby at each start of the carriage from a respective end of the tank the pull of the rope translates itself into tilting movement of the rake carrying frames before it becomes effective to start the carriage moving. That is to say, the pull of the drive rope R acts upon a pair of main drums $33^a$ and $33^b$ fixed upon a horizontal shaft 34 journalled upon the carriage frame and extending transversely of the tank. Upon and along this shaft 34 at intervals there are fixed auxiliary drum elements 35 or their equivalents engaged by individual rope elements 36 whereby a limited rotational motion of the shaft 34 is translated into corresponding tilting motion of the rake carrying frames $29^a$ and $29^b$.

The carriage U has a horizontal carriage frame 39 comprising a pair of wheeled side members 40 and 41 rigidly interconnected by a pair of transverse beams 42 and 43 which beams in turn have disposed at right angles thereto interconnecting members 44. The horizontal frame 39 furthermore is shown to have a pair of horizontally extending intersecting diagonal bracing members 44$^a$ and 47 in the central portion of the frame and additional pairs of intersecting diagonal bracing members 45 and 46 in the end portions of the frame.

Figure 2:
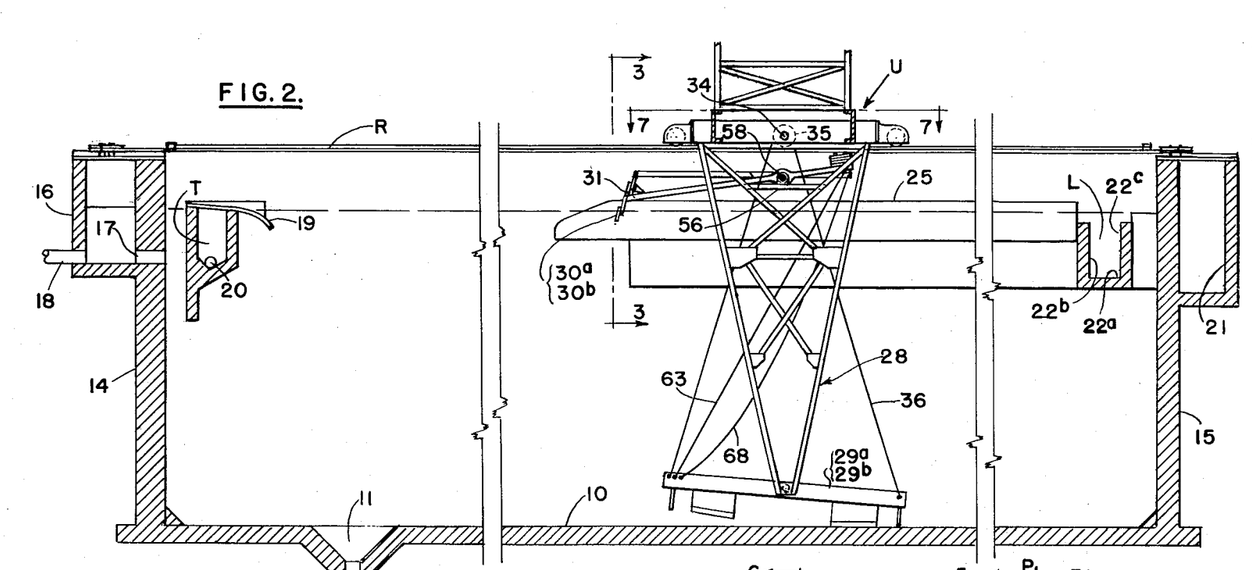
Figure 2 is a longitudinal sectional view taken on line 2—2 of Figure 1 showing more clearly the general arrangement of the skimming devices and of the actuating means therefor including the cam rail engaged by the auxiliary skimmer blade, as well as the means for functionally interconnecting the sludge engaging means with the scum skimming means.
Figure 3:
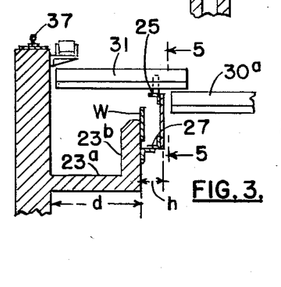
Figure 3 is a vertical part-sectional enlarged view taken on line 3—3 of Figure 2, to show the overflow launder with associated cam rail engaged by the auxiliary skimmer blade.
Figure 4:
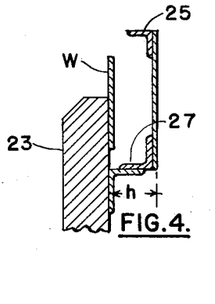
Figure 4 is a further enlarged detail view taken from Figure 3 of the cam rail structure proper in cross section.
Figure 5:
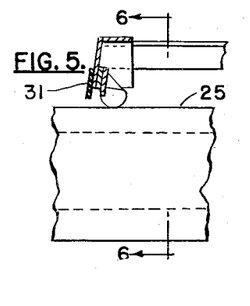
Figure 5 is a vertical sectional view taken on line 5—5 of Figure 3.
Figure 6:
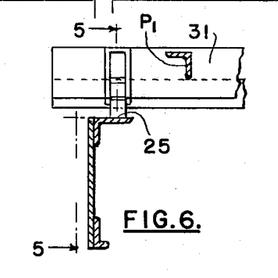
Figure 6 is a vertical sectional view taken on line 6—6 of Figure 5.
Figure 7:
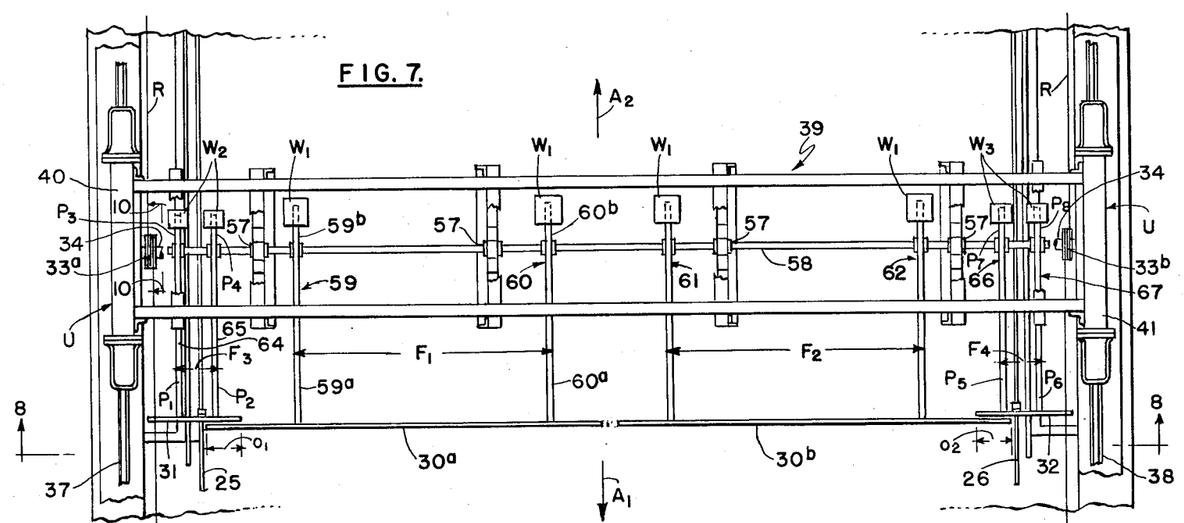
Figure 7 is an enlarged detail plan view of the carriage and associated tank wall portions, taken on line 7—7 of Figure 2.
Figure 8:
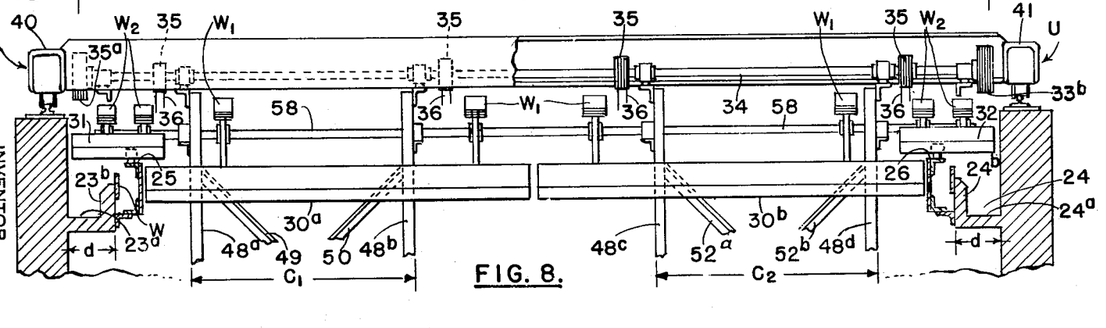
Figure 8 is a transverse sectional view taken on line 8—8 of Figure 7.
Figure 9:
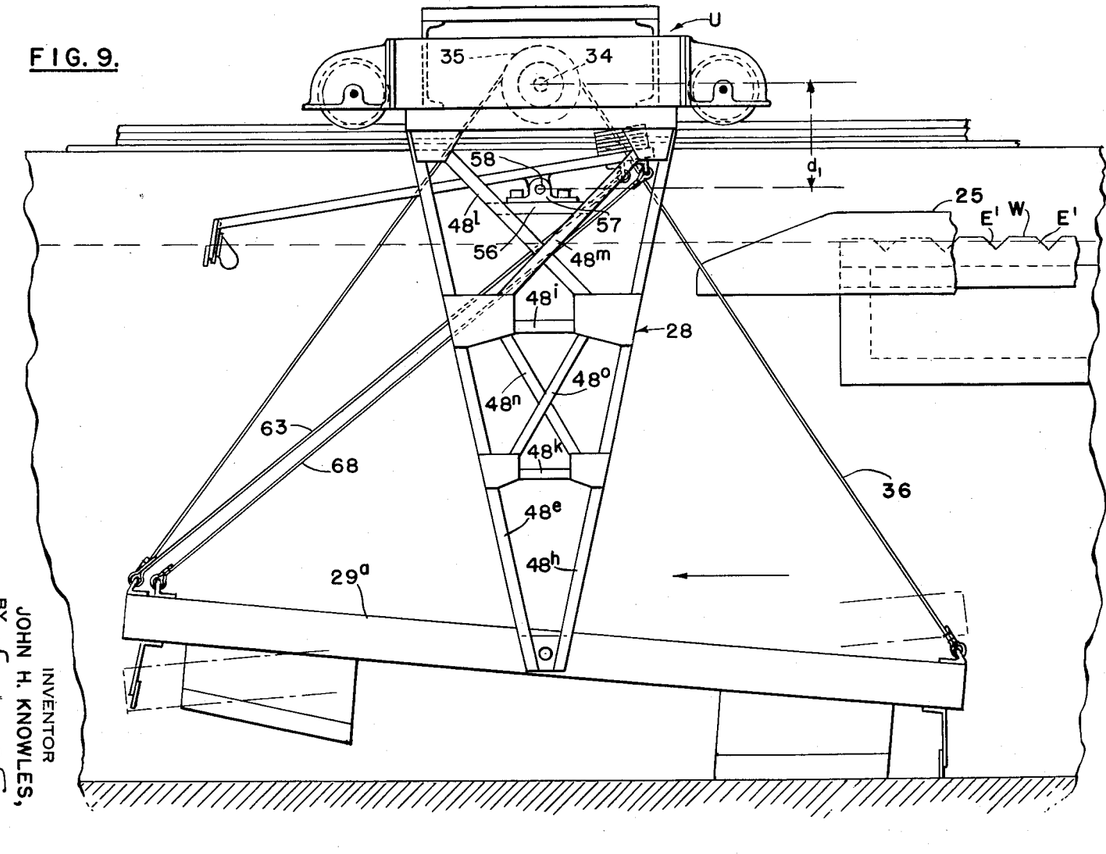
Figure 9 is an enlarged part-sectional side view of the reciprocating carriage structure similar to that appearing semidiagrammatically in Figure 2.

The carriage U has a horizontal carriage frame 39 which in turn has rigidly connected therewith and downwardly extending therefrom a depending bracket structure designated in its totality by numeral 28 comprising a series of four identical V-shaped brackets 48$^a$, 48$^b$, 48$^c$, 48$^d$, a sideview of the V-shape appearing in Figures 2 and 9. That is to say, the one pair of V-shaped brackets 48$^a$ and 48$^b$ being rigidly interconnected as by diagonal bracing 49 and 50 constitutes a composite bracket structure C$_1$ for mounting the one tiltable rake carrying frame 29$^a$. The other pair of V-shaped brackets 48$^c$ and 48$^d$ being rigidly interconnected as by diagonal bracing 52$^a$ and 52$^b$ constitutes a composite bracket structure C$_2$ for mounting the other tiltable rake carrying frame 29$^b$. Each of the four V-shaped brackets comprises a pair of inclined and downwardly converging main structural members 48$^e$ and 48$^h$ constituting the V-shape proper, an upper horizontal bracing member 48$^i$, a lower horizontal bracing member 48$^k$, a pair of upper diagonal bracing members 48$^l$ and 48$^m$, and a pair of lower diagonal bracing members 48$^n$ and 48$^o$.

The sediment engaging and conveying means proper as represented by the raking frames 29$^a$ and 29$^b$ are of a known construction, in that they have sets of sediment-engaging blades inclined in the manner of plowing blades and effective, when the carriage travels, to urge sediment from both sides of the tank bottom towards and into a central narrow longitudinal sediment collecting zone. Centrally disposed auxiliary scoop means may be provided to travel with the carriage, and to operate within the space between the two raking frames 29$^a$ and 29$^b$, for pushing the collected sediment along the central collecting zone towards and into the bottom outlet 11 of the tank. Such intermediately disposed scoop means and actuating mechanism are shown and described in the aforementioned copending patent application of Charles H. Scott, Serial No. 264,025, but are here not specially shown, since they can be exemplified otherwise and have no direct bearing structurally upon the functioning of the improved scum skimming devices of this invention to be described in detail further below.

That is to say, the raking frame 29$^a$ has a set of inclined raking blades at each end thereof, namely a set of blades 49 at one end, and a set of blades 50 at the other end. Similarly, the raking frame 29$^b$ has a set of blades 51 at one end and a set of blades 52 at the opposite end. The inclination of the respective sets of blades is such that the sets 50 and 52 engage the sediment when the carriage travels in the direction of arrow A$_1$ towards the feed end of the tank, whereas the sets 49 and 51 engage the sediment when the carriage travels in the direction of arrow A$_2$ towards the discharge end of the tank so that sediment is thereby collected in and along a narrow longitudinal central zone designated by its width F$_1$, upon the tank bottom, whence it is pushed or conveyed towards the sediment outlet 11 by the aforementioned scoop means (not shown).

Figure 10:
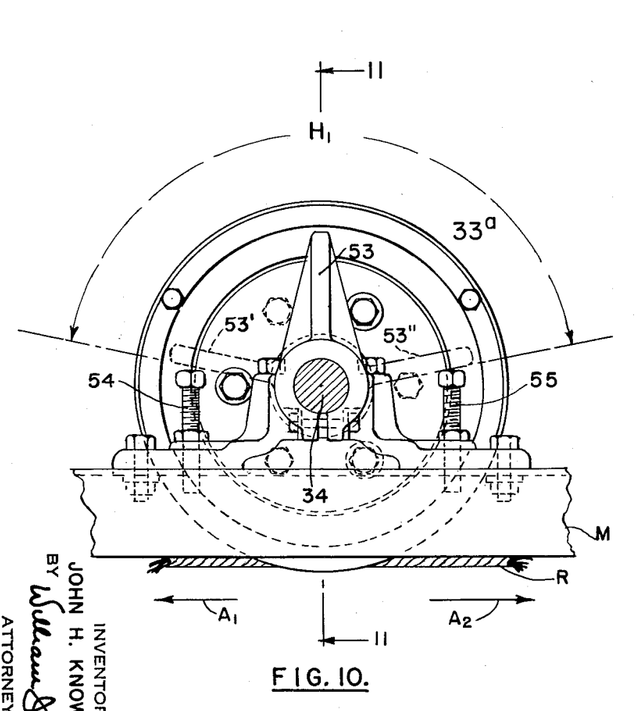
Figure 10 is a greatly enlarged detail sectional view of the carriage structure taken on line 10—10 of Figure 7, showing the functional part of the reversible rope drive mechanism.
Figure 11:
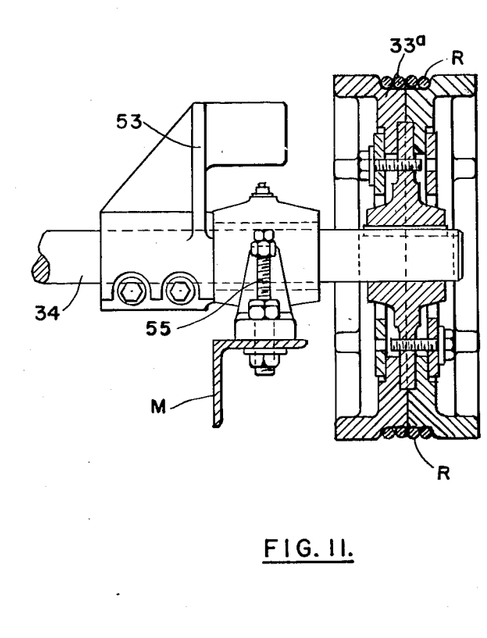

The appropriate tilting movement of the raking frames 29$^a$ and 29$^b$ for so delivering the sediment to the central longitudinal collecting zone F$_1$ is effected by the drive rope mechanism whenever the direction of travel of the carriage is reversed at each end of the tank. This tilting movement is due to the drive rope R imparting to main drums 33$^a$ and 33$^b$ and thus to the shaft 34 and thereby also to the auxiliary drums 35 a limited rotational movement the extent and effect of which appears more clearly from the enlarged detail Figures 10 and 11 of one of the main drums 33$^a$. That is to say, the drive rope R is attached to the periphery of the main drum in such a manner that the pull of the rope in the one or in the other direction will impart a corresponding rotation to shaft 34, the extent of that rotation being limited because of the provision of a stop arm 53 being fixed upon shaft 34 and a pair of adjustable abutment members or stops 54 and 55 mounted upon the carriage frame here indicated as by a structural member M. That is to say, when the rope pull is in the direction of arrow A$_1$ the corresponding rotation of shaft 34 is limited by stop arm 53 (see dot-and-dash line position 53' thereof) engaging the stop 54, whereas with the rope pulling in the opposite direction indicated by arrow A$_2$, the corresponding rotation of shaft 34 is limited by the stop arm 53 (see dotted line position 53" thereof) engaging the stop 55.

Thus, with each reversal in the direction of travel of the carriage, the shaft 34 is given a limited rotation as defined by the arc H$_1$ described by the stop arm 53 swinging between the stops 54 and 55. This limited rotational movement of shaft 34 imparts to the raking frames 29$^a$ and 29$^b$ a corresponding tilting movement, namely through the auxiliary drums 35 on shaft 34 acting through the associated motion translating rope elements 36.

There will now be rendered a detailed description of the special combination of scum skimming devices to operate upon the above defined irregular surface A, B, C, D, E, F, G, H in accordance with this invention.

Each of the four V-shaped bracket structures 48$^a$, 48$^b$, 48$^c$, 48$^d$ has in the upper portion thereof an additional short horizontal brace member 56 having mounted thereon a journal bearing 57, the row of these four journal bearings 57 serving to operatively support an auxiliary shaft 58 extending parallel to, although a distance $d_1$ below the aforementioned shaft 34.

Upon this auxiliary shaft 58 are provided arm structures to carry the above mentioned main skimmer blades 30$^a$ and 30$^b$ and auxiliary skimmer blades 31 and 32. The arm structures for the one main skimmer blade 30$^a$ comprise a pair of identical arms 59 and 60 fastened upon the auxiliary shaft 58, the arm 59 having a long end portion 59$^a$ and a short end portion 59$^b$, the arm 60 having a long end portion 60$^a$ and a short end portion 60$^b$. The arm structures for the other main skimmer blade 30$^b$ comprise a similar pair of arms 61 and 62, this other main skimmer blade being here shown to be substantially in alignment with the first main skimmer blade 30$^a$. The weight of the blade carrying ends of the arm structures 59, 60, 61, 62 is partially counterbalanced by weights W$_1$ provided upon the opposite short end portions of these arm structures. Also, each pair of these arm structures with its respective main skimmer blade thus constitutes a skimmer frame F$_1$ and F$_2$ respectively, each of which skimmer frames in turn is operatively coupled or interconnected with a respective rake carrying frame 29$^a$ and 29$^b$ located directly below so that with each reversal of the direction of the carriage travel the main skimmer frames F$_1$ and F$_2$ are tilted or swing in unison with their respective raking frames 29$^a$ and 29$^b$. When the carriage travels towards the scum receiving trough and feed end of the tank the main skimmer blades 30$^a$ and 30$^b$ of frames F$_1$ and F$_2$ will be in lowered scum engaging operative position whereas when travelling away from the feed end and scum receiving trough towards the discharge end of the tank, these main skimmer blades will have been raised to inoperative position in accordance with the tilted position of the raking frames (that is the dot and dash line position of these frames indicated in Figure 9).

The swinging movements of skimmer frames F$_1$ and F$_2$ to be coupled with the swinging movements of the raking frames 29$^a$ and 29$^b$, are here shown to be so coupled by way of one-way yieldable diagonally interconnecting members or linear flexible elements 63 which connect that end of a respective raking frame that points towards the feed end or scum receiving trough, with the weighted non-skimming end of the associated skimmer frame that points in the opposite direction towards the discharge end of the tank. That is to say, there are provided interconnector elements 63 (see Figures 2 and 9) which extend from the short rear ends of the main skimmer arm structures diagonally down to the correspondingly opposite ends of the raking frames. In this way, the main skimmer blades $30^a$ and $30^b$ will be effective to cover or sweep a main surface area corresponding to the wide swath $S_1$ of Figure $1^a$.

As for the auxiliary skimming devices, there is provided a first auxiliary skimmer frame $F_3$ next to the first main skimmer frame $F_1$, this auxiliary skimmer frame to be effective to sweep the surface area represented by the narrow swath $S_2$ of Figure $1^a$ disposed between the main swath $S_1$ and the sidewall 12 of the tank. This auxiliary skimmer frame $F_3$ comprises a pair of auxiliary arm structures 64 and 65 which are similar although slightly shorter than those of the main skimmer frames $F_1$ and $F_2$ and have fixed to the long end portions $P_1$ and $P_2$ thereof the auxiliary skimmer blade 31 shown to have an overlap $o_1$ with the adjoining main skimmer blade $30^a$. The short rear end portions $P_3$ and $P_4$ of these auxiliary arm structures have counterweights $W_2$ for partially counterbalancing the weight of the long blade carrying end portions $P_1$ and $P_2$.

A second auxiliary skimmer frame $F_4$, is provided next to the second main skimmer blade $F_2$ to be effective to sweep the surface area corresponding to the narrow swath $S_3$ extending between the wide swath $S_1$ and the sidewall 13 of the tank. This auxiliary skimmer frame $F_4$ comprises a pair of auxiliary arm structures 66 and 67 similar to although slightly shorter than those of main skimmer frames $F_1$ and $F_2$. The long end portions $P_5$ and $P_6$ of the auxiliary arm structures 66 and 67 having fixed thereto the auxiliary skimmer blade 32 are shown to have an overlap $o_2$ with the adjoining main skimmer blade $30^b$. The short end portions $P_7$ and $P_8$ of the auxiliary arm structures 66 and 67 have counterweights $W_3$ (similar to weights $W_2$ of the first auxiliary skimmer frame $F_3$) for the purpose of partially counterbalancing the weight of the long blade carrying end portions $P_5$ and $P_6$.

Each of the auxiliary skimmer frames $F_3$ and $F_4$ is operatively interconnected or coupled with the respective tiltable raking frame that lies directly below, substantially in the same manner that the respective adjoining main skimmer frames $F_1$ and $F_2$ respectively are so connected. That is to say, each auxiliary skimmer frame $F_3$ and $F_4$ has at least a one-way yieldable interconnector element 68 between it and the respective raking frame below, the interconnection being such as to act in the same sense as that of the interconnector elements 63 of the main skimmer frames $F_1$ and $F_2$.

The scope of this invention is not to be confined to the specific embodiment as shown in the drawings, employing the specifically U-shaped overflow launder structure with its corresponding arrangement of main and auxiliary skimmer blades. The invention more broadly expressed lies in providing at least one longitudinal overflow launder, irrespective of the provision of the transverse launder section, in combination with at least one main skimmer device and at least one auxiliary skimmer device, the operation and coaction of such skimmer devices to be controlled in a manner suitable to perform the desired operating cycle of the apparatus. For example, stripped of limitations this concept underlying the invention presents itself as a combination comprising at least one longitudinal launder section coacting with a combination of main skimmer means and auxiliary skimmer means, suitably controlled.

Figure 1B:
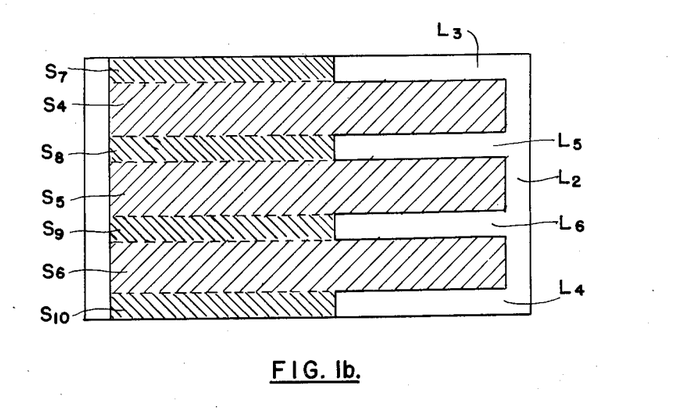

A more qualified embodiment lies in a combination that comprises transverse overflow launder means providing together with the longitudinal launder means an overflow launder that is L-shaped in plan view providing a single longitudinal launder section, or is U-shaped with two longitudinal launder sections. An example of a still further qualified embodiment provides a launder structure that is U-shaped in plan view, with the addition of intermediate longitudinal launder sections, in which case there are provided a plurality of main skimmer devices and a corresponding number of auxiliary skimmer devices. This latter embodiment is indicated in the diagrammatic Figure $1^b$.

In Figure $1^b$ the overflow launder structure comprises the U-shaped launder structure of Figure $1^a$, namely a transverse launder section $L_2$ with longitudinal launder sections $L_3$ and $L_4$, and furthermore a pair of additional intermediate longitudinal launder sections $L_5$ and $L_6$. Accordingly, such an embodiment will require three main skimming devices to serve three relatively wide full length swaths $S_4$, $S_5$, $S_6$ along with four auxiliary skimming devices to serve four narrow swaths $S_7$, $S_8$, $S_9$, $S_{10}$. Whereas the longitudinal launder sections $L_3$ and $L_4$ are supported from the respective sidewalls, the intermediate longitudinal launder sections may be suitably supported from the bottom of the tank.

Figure 12:
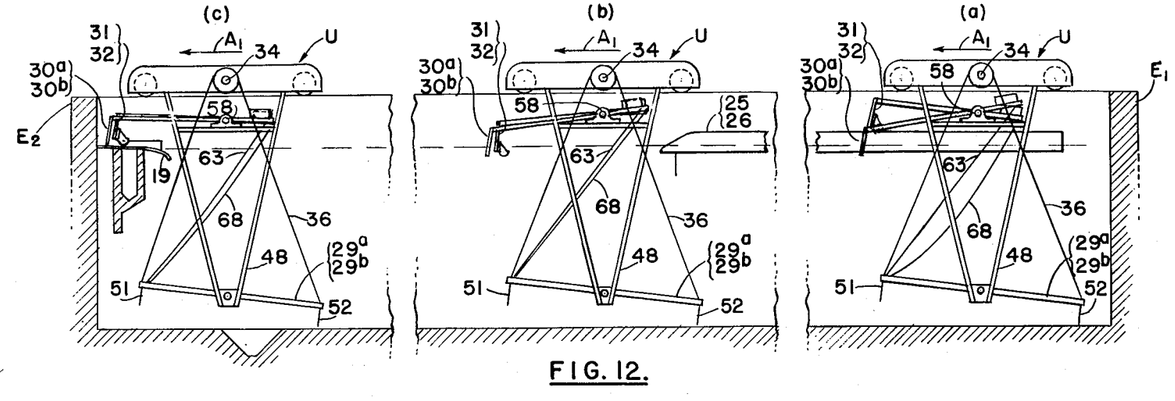
Figure 13:
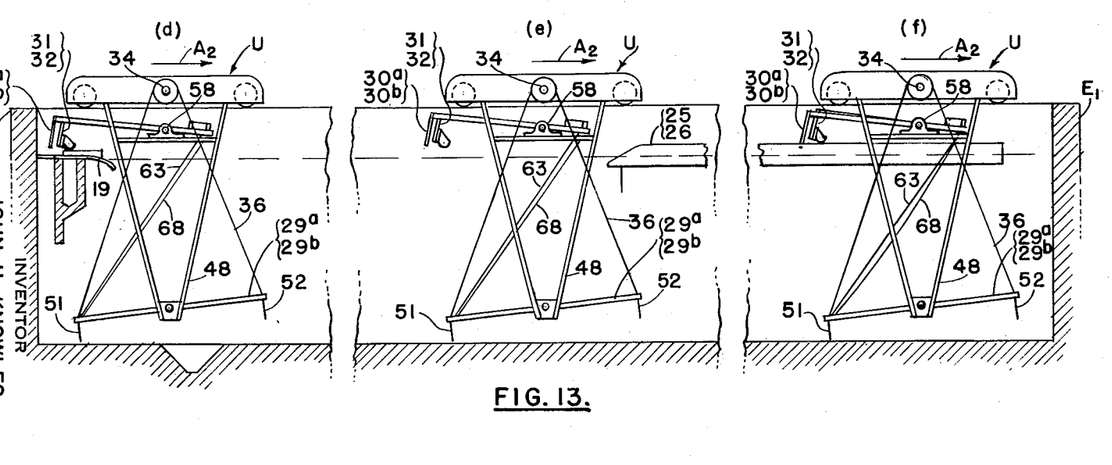
Figure 13 showing a carriage travelling from the feed end towards the discharge end of the tank with the skimming means inoperative.

The operation of the apparatus is illustrated by way of Figures 12 and 13 showing the operating cycle or round trip of the carriage 27, namely in Figure 12 the carriage travelling in the direction of arrows $A_1$ from the discharge end to the feed end of the tank, with the scum skimming devices operatively engaged, and in Figure 13 the carriage returning in the direction of arrows $A_2$ from the feed end to the discharge end of the tank with scum skimming devices inoperative. The sequential travelling positions of the carriage in Figure 12 are designated as $(a)$, $(b)$, $(c)$ respectively, while the sequential travelling positions in Figure 13 are designated as $(d)$, $(e)$, $(f)$.

Referring to Figure 12, with the carriage U starting from the discharge end $E_1$ of the tank, the pull of the drive rope R being reversed at this time from the direction $A_1$ to the direction $A_2$, will have the effect of imparting to the shaft 34 the aforementioned limited rotation as defined by the stop arm 53 (see Figure 10) moving from the dotted line position 53' through arc $H_1$ to the dotted line position 53'', thereby (through element 36) tilting the main raking frames $29^a$ and $29^b$ to the starting position indicated in position $(a)$ of the carriage, rendering the sediment raking blades 50, 52 operative preparatory to the subsequent raking movement of the carriage towards the opposite end of the tank. This initial tilting of the ranking frames also positions the main as well as the auxiliary scum skimmer blades through the one-way yieldable motion transmitting elements 63 and 68, so that the main skimmer blades $30^a$ and $30^b$ will drop to scum engaging operative position whereby it is adapted to subsequently sweep the surface area or swath $S_1$ of Figure $1^a$, this being evidenced by the then taut condition of the transmitting element 63. The auxiliary skimmer blades 31 and 32 meanwhile rest inoperatively upon the guide rails 25 and 26, although released from any pull of the transmitting elements 68 as is evidenced by the slackened condition thereof.

The pull of rope R in direction $A_1$ having thus positioned the raking frames and the skimmer blades, then starts moving the carriage itself from its $(a)$ position with the auxiliary skimmer blades 31 and 32 remaining inoperative while riding upon the cam rails 25 and 26, the main skimmer blades $30^a$ and $30^b$ meanwhile operatively covering a length "b" of the wide swath $S_1$ as far as the end of cam rails 25 and 26. Then, as the carriage continues, the auxiliary skimmer blades 31 and 32 ride off the ends of the cam rails thus operatively joining the main skimmer blades, that condition being indicated in the $(b)$ position of the carriage by the fact that now the transmitting elements 68 too appear taut. Thus, for the remaining portion of the trip in direction $A_1$, all the skimmer blades operate jointly, as the main skimmer blades sweep the remainder "e" of wide swath $S_1$, while the auxiliary skimmer blades 31 and 32 sweep the narrow swaths $S_2$ and $S_3$ respectively, until the scum collected by all the skimmer blades is delivered up the ramp 19 and into scum trough T as is indicated by the end position (c) of the carriage, and by both the transmitting elements 63 and 68 then in slightly slackened condition due to the skimmer blades riding onto the ramp. Thereupon the pull of the rope R is reversed from direction $A_1$ to direction $A_2$ for positioning the raking frames $29^a$ and $29^b$ as well as all the skimmer blades preparatory to the return trip of the carriage as depicted in Figure 13. That is to say, the rope pull now in direction $A_2$ rotates the shaft 34 so as to impart thereto a limited rotation corresponding to the stop arm 53 (see Figure 10) swinging from the dotted line position 53" through arc $H_1$ to the dot-and-dash line position 53'. As indicated in starting position (d) of the carriage, that rotation of shaft 34 will tilt the raking frames $29^a$ and $29^b$ so that now the raking blades 49 and 51 are rendered operative, while the tautness of the transmitting elements 63 and 68 gives evidence of the fact that simultaneously with such tilting both the main skimmer blades $30^a$ and $30^b$ and the auxiliary skimmer blades 31 and 32 are raised to and held in inoperative position. Thereupon the pull of the rope will initiate the return trip of the carriage in direction $A_2$ such as is indicated by the intermediate position (e) of the carriage. Having thus travelled the distance e with raking blades 49 and 51 operative, but all skimmer blades inoperative, the carriage reaches the point where the auxiliary skimmer blades 31 and 32 will reach cam rails 25 and 26 to engage the same as is indicated by the slightly slackened condition of transmitting elements 68 visible in the travelling end position (f) of the carriage. That is to say, the carriage completes its return trip in direction $A_2$ along the distance b with all skimmer blades inoperative but with raking blades 49 and 51 acting in the manner above set forth. When the carriage thus reaches the overflow discharge end $E_1$ of the tank, the rope pull is again reversed producing the condition corresponding to the initial position (a) of the carriage in Figure 12, thus completing the cycle of operation of the apparatus, covering the irregular skimming area A, B, C, D, E, F, G, H.

The collection and removal of the settled matter or sediment may be effected in a manner known from the patent application of Charles H. Scott, Serial No. 264,025, filed December 29, 1951, indicating that the tiltable raking frames being effective with both directions of carriage travel will convey the sediment from both sides of the tank bottom to a longitudinal collecting zone F' extending radially of the tank bottom, whence it is removed to and into the discharge sump 11 by accessory scoop devices in a manner here not shown in view of its disclosure and description in the said copending patent application of Scott No. 264,025.

I claim:

1. A longitudinal settling tank having a carriage spanning the tank and operable to reciprocate between the ends thereof, with sediment raking means supported from the carriage and operable by raising and lowering for effecting conveyance of sediment upon the tank bottom towards a bottom outlet incident to the travel of the carriage, said tank having a sediment discharge zone at the bottom, feed influent means as well as a scum receiving launder at one end of the tank, overflow discharge launder means at the opposite effluent end of the tank; characterized thereby that said launder means comprise a transverse launder section along the end wall of the tank as well as a longitudinal inwardly overhanging launder section extending part-way along each sidewall, and that there are provided a main scum skimming device comprising main skimmer blade means adapted for skimming a wide swath from end to end of the tank, the width of said wide swath being defined by the distance between said overhanging longitudinal launder section, and main actuating means for automatically raising and lowering said main skimmer blade means as between operative and inoperative position in timed relation with the carriage travel to effect one-way skimming towards said scum receiving trough; and that there is further provided at each side of the main skimming device an auxiliary skimming device comprising auxiliary blade means adapted for skimming a narrow swath part-way along said wide swath, namely from the inner end of said launder section, and auxiliary actuating means associated with said main actuating means for automatically raising and lowering said auxiliary blade means as between operative and inoperative positions so timed with respect to the carriage travel and the operation of said main actuating means as to effect one-way skimming along said narrow swath towards said scum receiving trough simultaneously with the skimming by said main blade means, both said main and said auxiliary skimming blade actuating means comprising main and auxiliary motion transmitting means respectively operatively interconnecting said raking means with said main and auxiliary blade means, said motion transmitting means being adapted to raise and lower both said blade means in timed relationship with the raising and lowering of said raking means, at least said auxiliary motion transmitting means comprising a one-way yieldable connection between said raking means and said auxiliary skimmer blade, with the addition of a cam rail element extending along said longitudinal launder section and cooperatively associated with said one-way yieldable connection and with said auxiliary skimmer blade means whereby said auxiliary skimmer blade means are adapted to override the associated longitudinal launder section incident to the back-and-forth travel of the carriage movement.

2. A settling tank according to claim 1, in which said raking means comprise a tiltable frame provided with a set of raking blade elements at each free end thereof, said frame being tiltable to raise and lower said sets of blade elements for conveying sediment from each end of the tank towards said discharge zone; in which both said main and said auxiliary skimmer blade means are also tiltably mounted, both said main and said auxiliary actuating means comprising one-way yieldable main and auxiliary motion transmitting means operatively interconnecting said raking frame with said main and said auxiliary skimming blade means respectively for tilting said blade means concurrently with the tilting of said rake carrying frame.

3. A longitudinal settling tank having a carriage spanning the tank and operable to reciprocate between the ends thereof, with sediment raking means supported from the carriage and operable by raising and lowering for effecting conveyance of sediment upon the tank bottom towards a bottom outlet incident to the travel of the carriage, said tank having a sediment discharge zone at the bottom, feed influent means as well as a scum receiving launder at one end of the tank, overflow discharge launder means at the opposite effluent end of the tank; characterized thereby that said launder means comprise at least one longitudinal launder section coextensive with the end-to-end direction of the tank and disposed substantially within an area corresponding to the bottom area of the tank and that there are provided a main scum skimming device comprising main skimmer blade means adapted for skimming a wide swath from end to end of the tank, together with main actuating means for automatically raising and lowering said skimmer blade means as between operative and inoperative position in timed relation with the carriage travel to effect one-way skimming of said wide swath towards said scum receiving trough; and that there is further provided at one side of the main skimming device an auxiliary skimming device comprising auxiliary blade means adapted for skimming a narrow swath partway along said wide swath, namely from the inner end of said launder section, together with auxiliary actuating means associated with said main actuating means for automatically raising and lowering said auxiliary blade means as between operative and inoperative positions so timed with respect to the carriage travel and the operation of said main actuating means as to effect one-way skimming along said narrow swath towards said scum receiving trough simultaneously with the skimming by said main blade means, said main and said auxiliary blade actuating means comprising main and auxiliary motion transmitting means respectively operatively interconnecting said raking means with said main and auxiliary blade means, said motion transmitting means being adapted to raise and lower both said blade means in timed relationship with the raising and lowering of said raking means, at least said auxiliary transmitting means comprising a one-way yieldable connection between said raking means and said auxiliary blade means, with the addition of a cam rail element extending along said longitudinal launder section and cooperatively associated with said one-way yieldable connection and with said auxiliary skimmer blade means whereby said auxiliary skimmer blade means are adapted to override the associated longitudinal launder section incident to the back-and-fourth travel of the carriage movement.

4. A settling tank according to claim 3, in which said raking means comprise a tiltable frame provided with a set of raking blade elements at each free end thereof, said frame being tiltable to raise and lower said sets of blade elements for conveying sediment from each end of the tank towards said discharge zone; in which both said main and said auxiliary skimmer blade means are also tiltably mounted, both said main and said auxiliary actuating means comprising one-way yieldable main and auxiliary motion transmitting means operatively interconnecting said raking frame with said main and said auxiliary skimming blade means respectively for tilting said blade means concurrently with the tilting of said rake carrying frame.

References Cited in the file of this patent

UNITED STATES PATENTS

| | | |
|---|---|---|
| 1,911,008 | Withington | May 23, 1933 |
| 1,986,573 | Hardinge | Jan. 1, 1935 |
| 2,160,838 | Dorr | June 6, 1939 |
| 2,215,185 | Lund | Sept. 17, 1940 |
| 2,264,912 | Kupper | Dec. 2, 1941 |
| 2,305,929 | Lund et al. | Dec. 22, 1942 |
| 2,611,489 | Scott | Sept. 23, 1952 |
| 2,670,080 | Scott | Feb. 23, 1954 |